United States Patent [19]

Tanaka et al.

[11] Patent Number: 5,422,687
[45] Date of Patent: Jun. 6, 1995

[54] CONTACT LENS WHEREIN CENTRAL CORRECTION REGION HAS A CENTER 0.2-2.4MM OFFSET FROM LENS GEOMETRIC CENTER AND A DIAMETER OF 0.8-3.5MM

[75] Inventors: Kyoichi Tanaka, Nagoya; Naoki Anan, Inuyama; Shingo Hibino, Kani, all of Japan; Yoshikazu Miura, Fresno, Calif.; Tadashi Sawano, Aichi, Japan; Kenichi Ishihara, Kasugai; Hiroyuki Oyama, Kakamigahara, Japan

[73] Assignee: Menicon Co., Ltd., Japan

[21] Appl. No.: 218,936

[22] Filed: Mar. 28, 1994

[30] Foreign Application Priority Data

Mar. 31, 1993 [JP] Japan ................................. 5-098563
Mar. 1, 1994 [JP] Japan ................................. 6-031263

[51] Int. Cl.$^6$ ............................................. G02C 7/04
[52] U.S. Cl. ................................................. 351/161
[58] Field of Search ............... 351/106 R, 160 H, 161, 351/162

[56] References Cited

U.S. PATENT DOCUMENTS

| | | | |
|---|---|---|---|
| 4,636,049 | 1/1987 | Blaker | 351/161 |
| 4,752,123 | 6/1988 | Blaker | 351/161 |
| 4,869,587 | 9/1989 | Breger | 351/161 |
| 5,151,723 | 9/1992 | Tajiri | 351/161 |

FOREIGN PATENT DOCUMENTS

| | | |
|---|---|---|
| 0201231 | 11/1986 | European Pat. Off. . |
| 1426491 | 12/1965 | France . |
| 2064158 | 6/1981 | United Kingdom . |
| 2086605 | 5/1982 | United Kingdom . |
| 2117130 | 10/1983 | United Kingdom . |

*Primary Examiner*—Scott J. Sugarman
*Attorney, Agent, or Firm*—Parkhurst, Wendel & Rossi

[57] ABSTRACT

A presbyopia correction contact lens to be used in contact with a cornea of an eye of a wearer, the contact lens having a substantially circular central correction region and an annular outer correction region which surrounds the central correction region, the central and outer correction regions providing one and the other of a near vision correction region and a distance vision correction region, respectively, wherein the central correction region has a center which is offset by a distance of 0.2 mm-2.4 mm from a geometric center of the contact lens toward a side portion of the lens, which side portion is to be located on the side of the nose of the wearer when the contact lens is used in contact with the cornea, and the central correction region has a diameter within a range of 0.8 mm-3.5 mm.

16 Claims, 3 Drawing Sheets

CONTACT LENS WHEREIN CENTRAL CORRECTION REGION HAS A CENTER 0.2-2.4MM OFFSET FROM LENS GEOMETRIC CENTER AND A DIAMETER OF 0.8-3.5MM

BACKGROUND OF THE INVENTION

1. Field of the Invention

The present invention relates in general to a presbyopia correction contact lens having a near vision correction region and a distance vision correction region, and more particularly to such contact lens having concentric correction areas of different correction powers.

2. Discussion of the Prior Art

There have been proposed multi-focus contact lenses for vision correction of a patient's eye having weakened accommodation faculties such as presbyopia. Such contact lens has a multiplicity of correction powers or a continuously changing correction power.

Such multi-focus contact lenses are divided into two major types. The first type is adapted such that a near vision correction region and a distance vision correction region are alternatively used as needed by the lens wearer, while the second type is adapted such that the near and distance vision correction regions are simultaneously used so that the desired distance from the wearer's eye is selected by an action of the wearer's brain to observe an object at that distance. Since the first type of lens requires sophisticated technology for processing the lens, and since the alternative use of the different correction regions for observation of the desired object is difficult, the second or simultaneous vision type adapted to observe the object through the two correction regions is currently prevailing.

Examples of the simultaneous vision type contact lens are disclosed in GB-A-2086605, U.S. Pat. No. 4,636,049, EP-A-201231 and U.S. Pat. No. 4,752,123. These publications propose various types of presbyopia correction contact lens, each of which has concentric near vision correction region and distance vision correction region that have different correction powers. However, these contact lenses are not necessarily satisfactory in their functions of corrections for both near and distance visions.

To find out a mechanism responsible for the above drawback encountered on such conventional presbyopia correction contact lenses, the present inventors made specimens of various types and experiments on patients' eyes. Extensive study and analysis based on the experiments revealed that most of the lens specimens were displaced or shifted on the eyes toward the corresponding ear of the lens wearer during use. It was also discovered that this tendency of displacement of the contact lens arises from the configuration of the cornea in general. Namely, the analysis indicated that the cornea of the human eyes has a larger curvature at a portion on the side of the ear than a portion on the side of the nose, so that the contact lens is more likely to be moved toward the portion of the cornea on the side of the corresponding ear.

On the other hand, it is known that the center of the pupil of the human eyes in general is offset about 0.2–0.6 mm from the center of the cornea toward the nose.

However, the known contact lenses are designed such that the concentric correction regions have a common center at the center of a circle defining the periphery of the lens (i.e., geometrical center of the lens), on the assumption that the geometric center of the lens is to be aligned with the pupil, while in fact the lens tends to be displaced toward the ear and the pupil is generally offset toward the nose. Consequently, the individual correction regions of the contact lens do not have a predetermined positional relationship with respect to the pupil of the eye, whereby the known contact lenses make it difficult for the lens wearers to obtain clear images through the near vision correction and distance vision correction regions.

A further research by the present inventors regarding the positional relationship between the correction regions of the contact lens and the pupils of the eyes revealed that near objects may be viewed even if the near vision correction region of the lens does not cover the entirety or the most of the area of the pupil, or distant objects may be viewed even if the distance correction region of the lens does not cover the entirety or the most of the area of the pupil.

SUMMARY OF THE INVENTION

It is therefore an object of the present invention to provide a presbyopia correction contact lens which has concentric near vision correction and distance vision correction regions having different correction powers and which assures clear imaging by each of these correction regions.

The above object may be achieved according to one aspect of the present invention, which provides a presbyopia correction contact lens to be used in contact with a cornea of an eye of a wearer, the contact lens having a substantially circular central correction region and an annular outer correction region which surrounds the central correction region, the central and outer correction regions providing one and the other of a near vision correction region and a distance vision correction region, respectively, wherein the central correction region has a center which is offset by a distance of 0.2 mm–2.4 mm from a geometric center of the contact lens in a direction from the geometric center toward a side portion of the contact lens which side portion is to be located on the side of the nose of the wearer when the contact lens lens is used in contact with said cornea, the geometric center being a center of a circle generally defined by a periphery of the contact lens, and wherein the central correction region has a diameter selected within a range of 0.8 mm–3.5 mm.

In the contact lens of the present invention constructed as described above, the common optical center of the circular central and annular outer correction regions which have different correction powers is offset from the geometric center toward the side portion of the lens on the side of the nose of the lens wearer, in view of the facts that the pupil of the eye is offset from the center of the cornea toward the nose while the contact lens tends to be displaced on the cornea toward the corresponding ear during use of the lens. In other words, the position of the central and outer correction regions are determined depending upon the actual position of the pupil with respect to the cornea, and the configuration of the cornea which causes the tendency of displacement of the contact lens on the cornea.

According to the presbyopia correction contact lens constructed according to the present invention, the central correction region is disposed within the area of the pupil such that the center of this central correction region is located at or near the center of the pupil, that is, the optical axis of the contact lens is almost aligned with the visual axis of the eye (which is substantially aligned with the center of the pupil), when the contact lens is actually used in contact with the cornea of the eye of the wearer.

Thus, when the contact lens is placed in position on the wearer's eye, the central and outer correction regions have a suitable positional relationship with the pupil of the eye so as to assure clear imaging by either one of the near vision correction and distance vision correction regions.

The central correction region may serve as either one of the near vision correction and distance vision correction regions. When the central correction region is used as the near vision correction region while the outer correction region is used as the distance vision correction region, the diameter of the central correction region is selected preferably within a range between 0.8 mm and 2.8 mm, and more preferably within a range between 1.0 mm and 2.0 mm.

When the central correction region is used as the distance vision correction region while the outer correction region is used as the near vision correction region, on the other hand, the diameter of the central correction region is selected preferably within a range between 1.2 mm and 3.5 mm, and more preferably within a range between 1.5 mm and 3.5 mm.

The contact lens may be provided with suitable rotation preventive means for preventing a rotary displacement of the contact lens during use in contact with the cornea.

When so-called "ballast" means for making heavier the bottom portion of the contact lens, for example, the rotation preventive means, the contact lens may be suitably processed to provide a slab-off portion near its periphery.

The center of the central correction region may be offset from the geometric center also in another direction perpendicular to the direction in which the center is offset by the distance of 0.2 mm–2.4 mm as described above.

The above object may also be achieved according to a second aspect of this invention, which provides a presbyopia correction contact lens to be used in contact with a cornea of an eye of a wearer, the contact lens having a substantially circular central correction region and an annular outer correction region which surrounds the central correction region, the central and outer correction regions providing one and the other of a near vision correction region and a distance vision correction region, respectively, wherein the central correction region is dimensioned and positioned with respect to a geometric center of the contact lens so that a center of the central correction region is substantially aligned with a center of a pupil of the eye, the geometric center being a center of a circle generally defined by a periphery of the contact lens, and wherein the central correction region is dimensioned so that the central correction region is located within the pupil.

BRIEF DESCRIPTION OF THE DRAWINGS

The above and optional objects, features and advantages of the present invention will be better understood by reading the following detailed description of presently preferred embodiments and examples of the invention, when considered in connection with the accompanying drawings, in which.

DETAILED DESCRIPTION OF THE PREFERRED EMBODIMENTS

Figure 1:
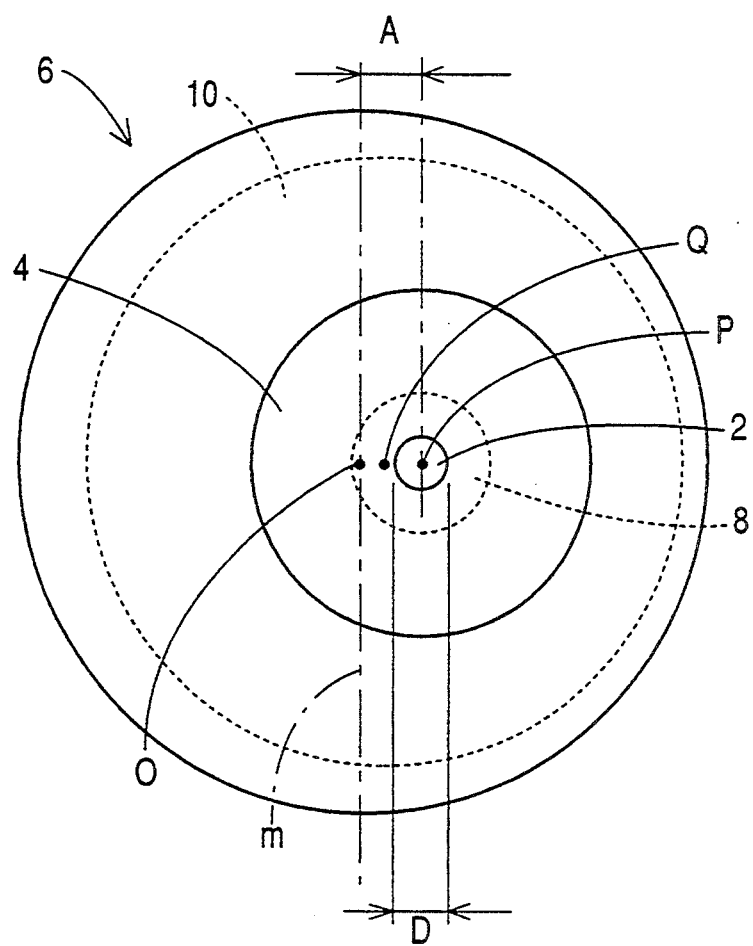
FIG. 1 is a plan view showing a structural arrangement of a presbyopia correction contact lens according to the principle of this invention.

Referring first to FIG. 1, there is shown a general structural arrangement of a bifocal presbyopia correction contact lens according to the principle of the present invention, as superimposed the cornea of a human eye. The contact lens generally indicated at 6 in FIG. 1 has a circular central correction region 2 disposed in a generally central area thereof, and an annular outer correction region 4 which surrounds the central correction region 2. The central and outer correction regions 2, 4 serve, respectively, as one and the other of a near vision correction region for vision correction for the patient's near vision and a distance vision correction region for power correction for the patient's distance vision. The circular and annular correction regions 2, 4 may be replaced by elliptical and elliptically annular regions. The optical center P of the central correction region 2 need not be aligned with that of the outer correction region 4. Namely, it is sufficient that the optical centers of the central and outer correction regions 2, 4 are substantially aligned with each other, and the areas or outer profiles of these two correction regions 2, 4 do not have to be fully consistent with each other. While the central correction region 2 should have a substantially circular periphery and an optical center P located substantially at the center of a circle generally defined by the periphery, the optical center of the annular outer correction region 4 need not be the geometric center, that is, need not be the center of a circle generally defined by its outer periphery.

The central correction region 2 is formed so as to satisfy the following conditions (a) and (b):

(a) The optical center (P) of the central correction region 2 is offset by a distance A from the geometric center O in the right direction as seen in FIG. 1, that is, toward a side portion of the lens 6 which is to be located on the side of the nose of the lens wearer when the lens 6 is placed in contact with a cornea 10 of an eye of the lens wearer. The geometric center O is the center of a circle generally defined by the periphery of the lens 6. The distance A should be selected within a range between 0.2 mm and 2.4 mm. Reference character m denotes a vertical line passing the geometric center O of the lens 6 when the lens 6 placed on the cornea 10 faces frontwards of the lens wearer.

(b) A diameter D of the central correction region 2 should be selected within a range between 0.8 mm and 3.5 mm.

If the offset distance A of the central correction region 2 with respect to the geometric center O were smaller than 0.2 mm, the central correction region 2 and the outer correction region 4 would not have a suitable positional relationship with a pupil 8 of the appropriate eye on which the lens 6 is placed for use. That is, the offset of the central correction region 2 toward the side portion of the lens 6 on the side of the wearer's nose would not provide an intended effect according to the present invention, and the lens 6 would be less likely to assure good imaging or viewing by each of the two correction regions 2, 4. The offset distance A of the center P of the central correction region 2 is selected preferably within a range of 0.3 mm-2.0 mm, and more preferably within a range of 0.3 mm-1.0 mm.

If the central correction region 2 is too small, the amount of light entering the pupil 8 through that region 2 would be insufficient for the intended vision correction, resulting in difficulty for the region 2 to achieve the assigned near vision or distance vision correction. If the central correction region 2 is too large, the area of the outer correction region 4 which is superimposed on the pupil 8 would be insufficient, resulting in difficulty for the region 4 to achieve the intended near vision or distance vision correction.

It is empirically known that where the central correction region 2 is used as the near vision correction region, there is a high risk of inadequate distance vision correction if the near vision correction region 2 covers 40% or more of the entire area of the pupil 8. This risk would arise because a comparatively large amount of light should enter the pupil through the outer distance vision correction region 4 for viewing distant objects, and because near objects may possibly overlap the distant objects which the wearer desires to view, leading to discomfort felt by the wearer. Where the central correction region 2 is used as the distant vision correction region, on the other hand, the amount of light entering the pupil 8 through the outer near vision correction region 4 would be insufficient if the central distant vision correction region 2 covers a most of the entire area of the pupil 8, an optical contrast would be too low to correctly view the near objects.

According to the above analysis, the diameter D of the central correction region 2 is held preferably within a range between 0.8 mm and 2.8 mm, and more preferably within a range between 1.0 mm and 2.0 mm when the central region 2 is used as the near vision correction region. When the central region 2 is used as the distance vision correction region, the diameter D is held preferably within a range between 1.2 mm and 3.5 mm, and more preferably within a range between 1.5 mm and 3.5 mm.

Thus, the central correction region 2 is positioned and dimensioned so as to satisfy the above-indicated two conditions (a) and (b), and the annular outer correction region 4 is formed so as to surround the central correction region 2, so that the central and outer correction regions 2 and 4 of the bifocal contact lens 6 have substantially the same optical center P, as indicated in FIG. 1. Accordingly, the contact lens 6 according to the present invention has the two concentric correction regions 2, 4 having different correction powers. Described more specifically, when the contact lens 6 is used on the wearer's eye, the central correction region 2 is advantageously oriented such that the region 2 is entirely disposed within the area of the pupil 8, with the optical center P of the region 2 being located at or close to the center of the pupil 8. Consequently, the optical centers P of the central and outer correction regions 2, 4 are aligned with the visual axis, being located at or near the center of the pupil 8. This arrangement permits both of the central and outer correction regions 2, 4 to have adequate areas superimposed on the pupil 8 of the eye, assuring clear viewing of the near and distant objects through one and the other of the central and outer regions 2, 4. In FIG. 1, reference character Q denotes the geometric center of the cornea 10 of the eye.

According to the bifocal presbyopia correction contact lens 6 having the substantially circular central correction region 2 which satisfies the above conditions (a) and (b) and the surrounding concentric annular outer correction region 4, the optical center P of the correction regions 2, 4 would not deviate from the visual axis of the eye, irrespective of some variations in the configuration of the cornea 10 and the position of the pupil 8 of the eyes of the individual wearers. Therefore, the contact lens 6 ensures a high level of clearness of images of the near and distant objects obtained through the two vision correction regions 2, 4. For enhanced vision correction performance of the contact lens 6, however, it is desirable to tailor the specifications (in particular, distance A) of the central correction region 2 to the particular eye characteristics of the lens wearer or patient in question, within the ranges of the distance A and diameter D specified above as the conditions (a) and (b).

The tailoring of the contact lens 6 to the particular eye characteristics of the lens wearers may be effected, for example, by first placing a test contact lens on the eye of a specific lens wearer, and measuring the amount of offset of the geometric center of the test contact lens from the center of the pupil 8 of the eye. The test contact lens has an inner eye-contacting surface which has the same shape as the contact lens 6 to be tailored to the wearer's eye. The measurement of the offset amount of the geometric center of the test contact lens with respect to the pupil 8 is made when the test contact lens is located at the most stable position on the cornea 10. Based on the thus measured offset amount, the central and outer correction regions 2, 4 of the contact lens 6 are positioned such that the common optical center P of the regions 2, 4 is offset from the geometric center O of the contact lens 6, by the distance A equal to the measured offset amount. The specifications relating to the inner eye-contacting surface of the test contact lens may be determined by measuring the shape (curvature) of the corneal surface, using a known cornea measuring instrument (e.g., Keratometer), as in the case of ordinary corneal contact lens. The test contact lens is generally provided with a suitable marking indicating the geometric center, so that the optometrist can visually recognize the geometric center of the test contact lens upon measurement of the offset amount indicated above.

Figure 5:
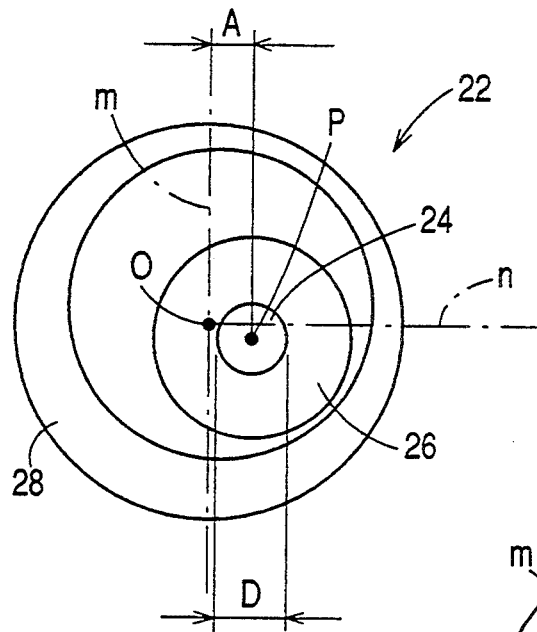
FIG. 5 is a plan view showing one embodiment of the contact lens of the present invention.
Figure 7:
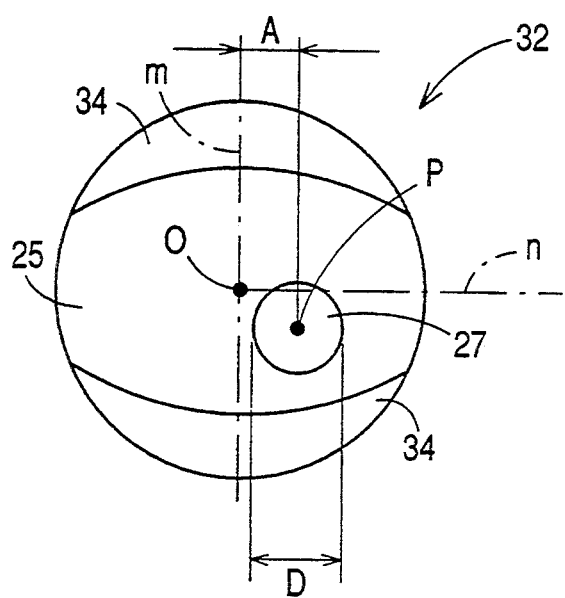
FIG. 7 is a plan view showing a further embodiment of the contact lens of the invention.

While the optical center P of the central correction region 2 as shown in FIG. 1 is not offset from the geometric center O of the contact lens 6 in the vertical direction, the optical center P may be offset from the geometric center O in the vertical direction, namely, to a point above or below the geometric center O, as indicated in the embodiments of FIGS. 5 and 7 which will be described. This offset may be desirable or required to align the optical center P of the correction regions 2, 4 with the pupil 8 of the patient.

Figure 2:
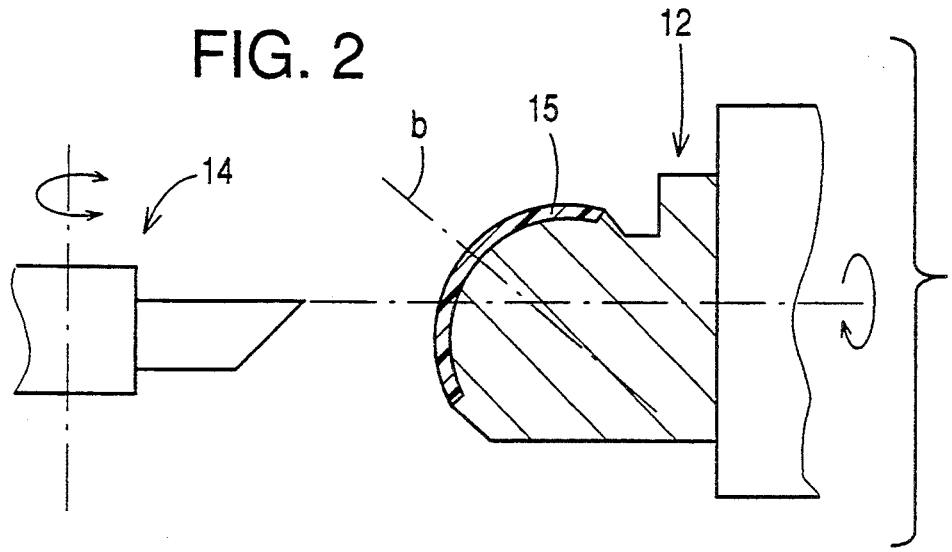
FIG. 2 is a view for explaining a process of forming a contact lens by machining.

The presbyopia correction contact lens according to the present invention may be fabricated using various known lens materials, by ordinary known methods such as molding or cutting by a lathe. An example of the fabrication process by machining is illustrated in FIG. 2, in which a lens material 15 is held by a rotary fixture 12 such that a main axis b of the lens material 15 is inclined with respect to the axis of the fixture 12, so that the material 15 is machined by a rotary cutting tool 14, to produce the desired contact lens.

Figure 3:
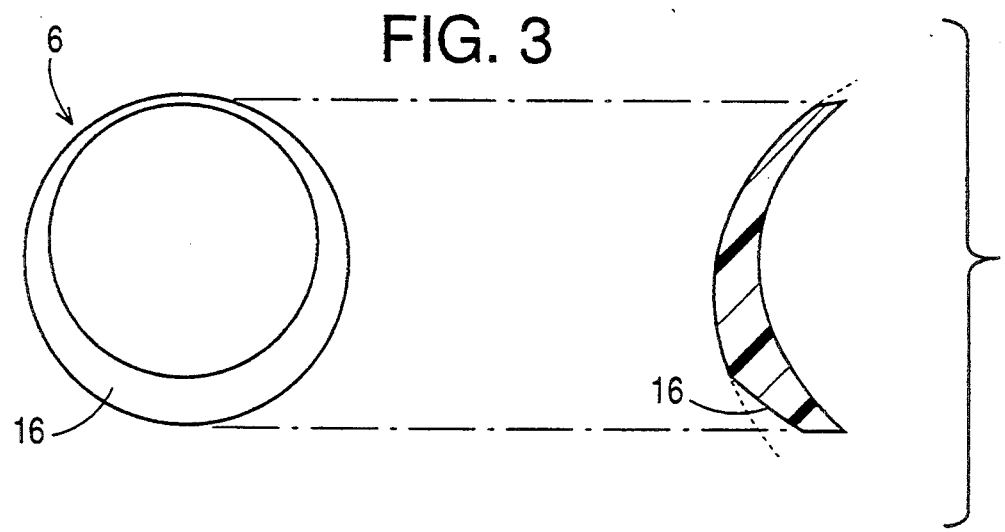
FIG. 3 is a combination of a plan view and a side elevational view in cross section of a contact lens having one form of rotation preventive means.
Figure 4:
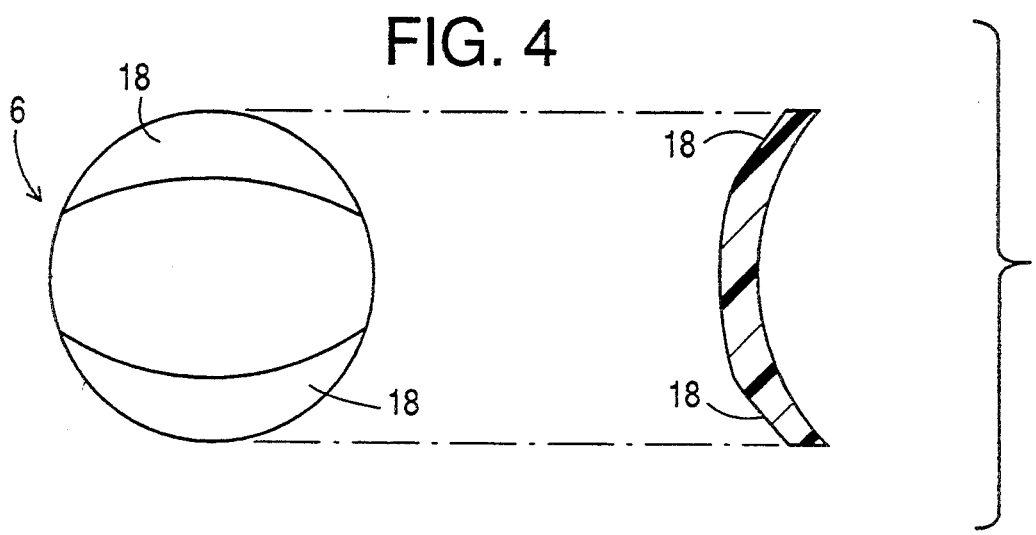
FIG. 4 is a combination of a plan view and a side elevational view in cross section of a contact lens, showing another form of the rotation preventive means provided on the contact lens.

It is noted that the contact lens 6 should be oriented with respect to the wearer's eye such that the common optical center P of the central and outer correction regions 2, 4 is offset from the center Q of the cornea 10 of the eye, which in turn is offset on the side of the nose of the lens wearer. In view of this requirement, the contact lens 6 is generally provided with suitable rotation preventive means for preventing rotational displacement of the lens 6 during use in contact with the cornea 10. Such rotation preventive means is effective to assure stable coincidence or alignment of the optical center P of the correction regions 2, 4 with the visual axis of the wearer's eye. Described in detail, the contact lens 6 is provided with various "ballast" means such as a prism ballast, which causes the lens 6 to have a gravity center at a relatively lower portion thereof, due to a mutual offset of the centers of the inner and outer surfaces of the lens. Usually, the "ballast" means increases the thickness of the contact lens 6 at its peripheral portion which does not optically function. To reduce the thickness of such peripheral portion, the lens 6 is subjected to a so-called "slab-off" machining to form a slab-off portion 16 as shown in FIG. 3 by way of example, or a thickness-reducing process to form an upper and a lower thin-walled portions 18, 18 as shown in FIG. 4 by way of example. The upper and lower thin-walled portions 18, 18, which correspond to the upper and lower eyelids of the lens wearer, assure increased stability of positioning of the lens 6 on the wearer's eye.

Figure 6:
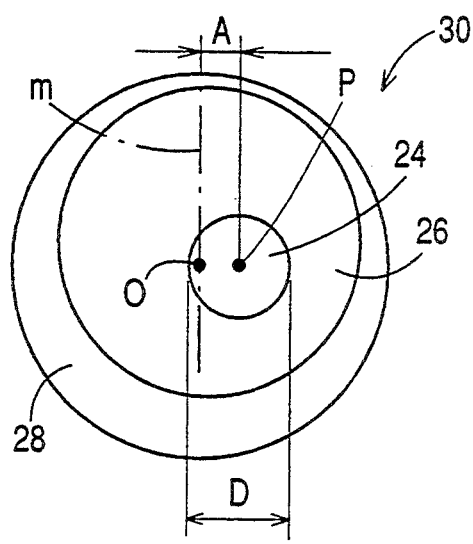
FIG. 6 is a plan view showing another embodiment of the contact lens of the invention.

Referring next to FIGS. 5, 6 and 7, there will be described some embodiments of the presbyopia correction contact lens of this invention, which are indicated generally at 22, 30 and 32, respectively. In the contact lenses 22 and 30 of FIGS. 5 and 6, the central correction region is used as the near vision correction region. In the contact lens 32 of FIG. 7, the central correction region is used as the distance vision correction region. In FIGS. 5-7, reference numerals 24 and 25 denote the near vision correction region, while reference numerals 26, 27 denote the distance vision correction region. Reference numerals 28 and 34 denote slab-off portion and thin-walled portions, respectively, which are examples of the rotation preventive means.

The contact lens 22 will be described in detail by reference to FIG. 5. In this lens 22 (which has a diameter of 14.0 mm), the optical center P of the central near vision correction region 24 is offset by a distance A of 1.0 mm from the geometric center O of the lens 22, in the right direction (to the right of a vertical line m passing the center O), that is, toward the side portion of the lens 22 which is to be located on the side of the nose of the lens wearer when the contact lens 22 is placed in contact with the cornea of the lens wearer. Also, the optical center P of the central near vision correction region 24 is offset by a distance of 0.18 mm from the geometric center O (from a horizontal line n passing the center O) in the downward direction. Further, the central near vision correction region 24 has a circular shape with a diameter D of 1.8 mm. The outer distance vision correction region 26 is formed so as to surround the central near vision correction region 24. This arrangement permits the common optical center P of the central near vision correction region 24 and the outer distance vision correction region 26 to be held substantially aligned with the center of the pupil of the eye, with the central region 24 kept disposed within the area of the pupil, when the contact lens 30 is placed in contact with the cornea of the patient, irrespective of some variation in the diameter of the pupil depending upon the light condition or illuminance (the diameter of the pupil generally ranging from about 2.5 mm to about 4.0 mm under average indoor light condition). The outer distance vision correction region 26 has a diameter of 8.0 mm.

In the contact lens 30 of FIG. 6 (which has a diameter of 14.0 mm), the optical center P of the central near vision correction region 24 is offset by a distance A of 0.3 mm from the geometric center O of the lens 30, in the right direction (to the right of the vertical line m), that is, toward the side portion of the lens 30 which is to be located on the side of the nose of the lens wearer. Further, the central near vision correction region 24 has a circular shape with a diameter D of 1.2 mm. The outer distance vision correction region 26 surrounding the central near vision correction region 24 is partially cut off at its peripheral portion due to a slab-off machining to form the slab-off portion 28. This arrangement also permits the common optical center P of the central near vision correction region 24 and the outer distance vision correction region 26 to be held substantially aligned with the center of the pupil of the eye, with the central region 24 kept disposed within the area of the pupil, when the contact lens 30 is placed in contact with the cornea of the patient.

In the contact lens 32 of FIG. 7 (which has a diameter of 14.0 mm), the optical center P of the central distance vision correction region 27 is offset by a distance A of 1.5 mm from the geometric center O of the lens 32, in the right direction (to the right of the vertical line m), that is, toward the side portion of the lens 32 which is to be located on the side of the nose of the lens wearer. Also, the optical center P of the central distance vision correction region 27 is offset by a distance of 0.5 mm from the geometric center O (from the horizontal line n) in the downward direction. Further, the central distance vision correction region 27 has a circular shape with a diameter D of 2.0 mm. The outer near vision correction region 25 is formed so as to surround the central distance vision correction region 27. The present arrangement also permits the common optical center P of the central distance vision correction region 27 and the outer near vision correction region 25 to be held substantially aligned with the center of the pupil of the eye, with the central region 27 kept disposed within the area of the pupil, when the contact lens 32 is placed in contact with the cornea of the patient. The outer near vision correcting region 25 has a generally elliptical shape due to the thin-walled portions 34, 34 formed at the upper and lower portions of the contact lens 32.

Thus, the presbyopia correction bifocal contact lenses 22, 30, 32 are designed so as to satisfy the conditions (a) and (b) indicative above, so that both the near vision correction region 24, 25 and the distance vision correction region 26, 27 permit clear viewing of the near and distant objects.

While the present invention has been described above in detail in its presently preferred embodiments with a certain degree of particularity, it is to be understood that the invention is not limited to the details of the illustrated embodiments, but may be embodied with various changes, modifications and improvements, which may occur to those skilled in the art, without departing from the spirit and scope of the invention defined in the following claims.

For instance, the presbyopia correction contact lens according to the present invention is not limited to a bifocal contact lens having the near vision correction and distance vision correction regions having different correction powers as in the illustrated embodiments. For example, the contact lens according to the invention may have an intermediate region formed concentrically with and between the near vision correction and distance vision correction regions such that the correction powers continuously varies from that of the near vision correction region to that of the distance vision correction region, for example.

What is claimed is:

1. A presbyopia correction contact lens to be used in contact with a cornea of an eye of a wearer, said contact lens having a substantially circular central correction region and an annular outer correction region which surrounds said central correction region, said central and outer correction regions providing one and the other of a near vision correction region and a distance vision correction region, respectively, wherein the improvement comprises
said central correction region having a center which is offset by a distance of 0.2 mm–2.4 mm from a geometric center of the contact lens in a direction from said geometric center toward a side portion of the lens which side portion is to be located on the side of the nose of said wearer when the contact lens is used in contact with said cornea, said geometric center being a center of a circle which defines a periphery of the contact lens; and
said central correction region having a diameter within a range of 0.8 mm–3.5 mm.

2. A presbyopia correction contact lens according to claim 1, wherein said distance is selected within a range of 0.3 mm–2.0 mm.

3. A presbyopia correction contact lens according to claim 2, wherein said distance is selected within a range of 0.3 mm–1.0 mm.

4. A presbyopia correction contact lens according to claim 1, wherein said central correction region provides said near vision correction region, and has a diameter within a range of 0.8 mm–2.8 mm.

5. A presbyopia correction contact lens according to claim 4, wherein said central correction region has a diameter within a range of 1.0 mm–2.0 mm.

6. A presbyopia correction contact lens according to claim 1, wherein said central correction region provides said distance vision correction region, and has a diameter within a range of 1.2 mm–3.5 mm.

7. A presbyopia correction contact lens according to claim 6, wherein said central correction region has a diameter within a range of 1.5 mm–3.5 mm.

8. A presbyopia correction contact lens according to claim 1, comprising rotation preventive means for preventing rotation of the contact lens during use in contact with said cornea.

9. A presbyopia correction contact lens according to claim 8, wherein said rotation preventive means comprises ballast means, and a slab-off portion near said periphery.

10. A presbyopia correction contact lens according to claim 1, wherein said center of said central correction region is offset from said geometric center also in another direction perpendicular to said direction in which said center of said central correction region is offset from said geometric center by said distance of 0.2 mm–2.4 mm.

11. A presbyopia correction contact lens according to claim 10, wherein said center of said central correction region is offset from said geometrical center in a downward direction toward a bottom portion of the contact lens.

12. A presbyopia correction contact lens to be used in contact with a cornea of an eye of a wearer, said contact lens having a substantially circular central correction region and an annular outer correction region which surrounds said central correction region, said central and outer correction regions providing one and the other of a near vision correction region and a distance vision correction region, respectively, wherein the improvement comprises
said central correction region being dimensioned and positioned with respect to a geometric center of the contact lens so that a center of said central correction region is substantially aligned with a center of a pupil of said eye, said geometric center being a center of a circle generally defined by a periphery of the contact lens; and
said central correction region being dimensioned so that said central correction region is located within said pupil.

13. A presbyopia correction contact lens according to claim 12, wherein said central correction region provides said near vision correction region and has a diameter within a range of 0.8 mm–2.8 mm.

14. A presbyopia correction contact lens according to claim 13 wherein said central correction region has a diameter within a range of 1.0 mm–2.0 mm.

15. A presbyopia correction contact lens according to claim 13, wherein said central correction region provides said distance vision correction region and has a diameter within a range of 1.2 mm–3.5 mm.

16. A presbyopia correction contact lens according to claim 15, wherein said central correction region has a diameter within a range of 1.5 mm–3.5 mm.

* * * * *